(12) United States Patent
Hsieh et al.

(10) Patent No.: US 11,127,329 B2
(45) Date of Patent: Sep. 21, 2021

(54) DISPLAY DEVICE AND IMAGE DISPLAY METHOD

(71) Applicant: Realtek Semiconductor Corporation, Hsinchu (TW)

(72) Inventors: Hung-Chun Hsieh, Hsinchu (TW); Chun-Hao Huang, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 16/984,550

(22) Filed: Aug. 4, 2020

(65) Prior Publication Data
US 2021/0264831 A1    Aug. 26, 2021

(30) Foreign Application Priority Data
Feb. 26, 2020   (TW) .................. 109106313

(51) Int. Cl.
*G09G 3/20* (2006.01)
*G06F 3/0346* (2013.01)

(52) U.S. Cl.
CPC ............ *G09G 3/20* (2013.01); *G06F 3/0346* (2013.01); *G09G 2340/0492* (2013.01); *G09G 2354/00* (2013.01); *G09G 2356/00* (2013.01); *G09G 2370/06* (2013.01); *G09G 2370/16* (2013.01)

(58) Field of Classification Search
CPC ........... G06F 3/1454; G06F 2200/1614; G06F 3/0346; G09G 2340/0492; G09G 2310/04; G09G 3/20; G09G 5/005; G09G 2340/0442; G09G 2354/00; G09G 2356/00; G09G 2370/06; G09G 2370/16
See application file for complete search history.

(56) References Cited

U.S. PATENT DOCUMENTS

| | | |
|---|---|---|
| 2015/0194135 A1 | 7/2015 | Higashi et al. |
| 2015/0200998 A1* | 7/2015 | Gu ................. G06F 3/1454 709/208 |
| 2016/0188282 A1* | 6/2016 | Tang ................. G09G 5/12 345/1.1 |
| 2018/0006762 A1 | 1/2018 | Yang et al. |
| 2018/0364881 A1 | 12/2018 | Lee et al. |
| 2020/0167023 A1* | 5/2020 | Lee ................. G06F 3/048 |

* cited by examiner

*Primary Examiner* — Stephen G Sherman
*Assistant Examiner* — Aaron Midkiff
(74) *Attorney, Agent, or Firm* — Locke Lord LLP; Tim Tingkang Xia, Esq.

(57) ABSTRACT

A display device configured to receive an input image of an electronic device. The display device comprises a display panel, a scanning circuit, and an adjusting circuit. The display panel comprises an active zone. The scanning circuit is configured to determine a display region of the active zone in which the input image is displayed. The adjusting circuit is coupled to the scanning circuit. The adjusting circuit is configured to capture an image of the display region when an adjusting signal associated with the display panel is received in order to display the image of the display region on the active zone correspondingly.

14 Claims, 6 Drawing Sheets

DISPLAY DEVICE AND IMAGE DISPLAY METHOD

CROSS-REFERENCE TO RELATED APPLICATION

This application claims priority to and the benefit of Taiwan Application Serial Number 109106313, filed on Feb. 26, 2020, the entire content of which is incorporated herein by reference as if fully set forth below in its entirety and for all applicable purposes.

BACKGROUND

Field of Disclosure

The disclosure generally relates to an electronic device and a processing method, and more particularly, to a display device and an image display method.

Description of Related Art

With the advance of technology, the functions of the mobile device are more and more varied and powerful. Benefit from the design for the size of the mobile device, it is more convenient to carry the mobile device. On the contrary, the display of the mobile device is smaller because of the design for the entirety of the mobile device.

For providing the user both of the usage operability of the mobile device and the comfort of viewing the screen of the mobile device, the mobile device can be connected to the display device which has the large screen, such that the screen of the mobile device can be projected onto the large display device. However, once the screen of the mobile device is projected onto the large display device and the large display device is rotated, the output of the mobile device has to be adjusted for the display contents of the large display device and therefore the screen of the large display device is suitable for the user to watch.

SUMMARY

The present disclosure of an embodiment provides a display device configured to receive an input image of an electronic device. The display device comprises a display panel, a scanning circuit, and an adjusting circuit. The display panel comprises an active zone. The scanning circuit is configured to determine a display region of the active zone in which the input image is displayed. The adjusting circuit is coupled to the scanning circuit. The adjusting circuit is configured to capture an image of the display region when an adjusting signal associated with the display panel is received in order to display the image of the display region on the active zone correspondingly.

The present disclosure of an embodiment provides an image display method configured for a display device which is coupled to an electronic device. The display device comprises a display panel. The image display method comprises the following steps: receiving, by the display device, an input image of the electronic device; determining a display region of the active zone of the display panel in which the input image is displayed; capturing an image of the display region when an adjusting signal associated with the display panel is received; and displaying the image of the display region on the active zone correspondingly.

BRIEF DESCRIPTION OF THE DRAWINGS

The disclosure can be more fully understood by reading the following detailed description of the embodiments, with reference made to the accompanying drawings as described below.

DETAILED DESCRIPTION

The technical terms "first", "second" and the similar terms are used to describe elements for distinguishing the same or similar elements or operations and are not used for limiting the technical elements and the order of the operations of the present disclosure. Furthermore, the element symbols/alphabets of each embodiment can be used repeatedly in the present disclosure. The same and similar technical terms can be represented by the same or similar symbols/alphabets in each embodiment. The repeated symbols/alphabets are used for simplicity and clarity and not limited to the relation between the embodiments.

Figure 1A:
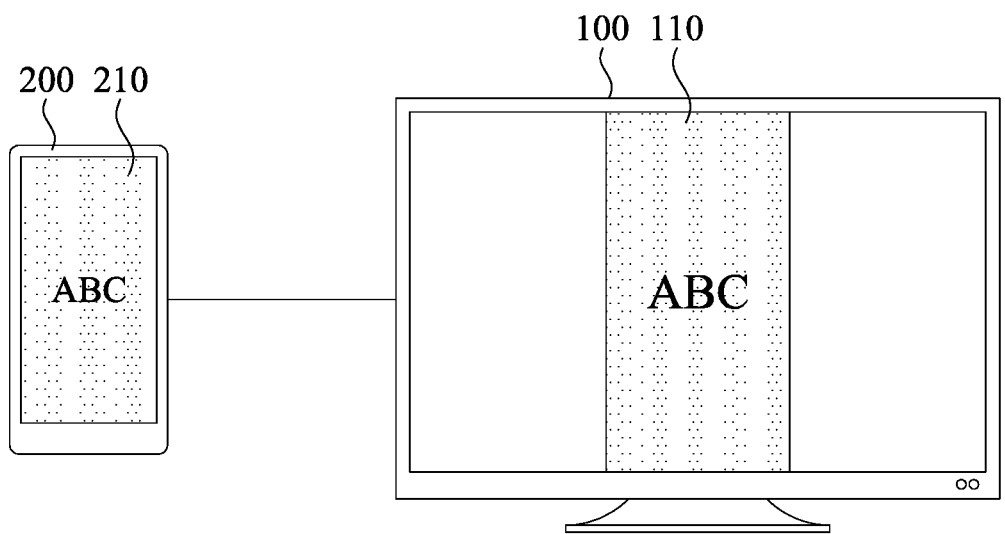
FIG. 1A is a schematic diagram illustrating a screen of a mobile device that is projected onto a display device according to some embodiments of the present disclosure.
Figure 1B:
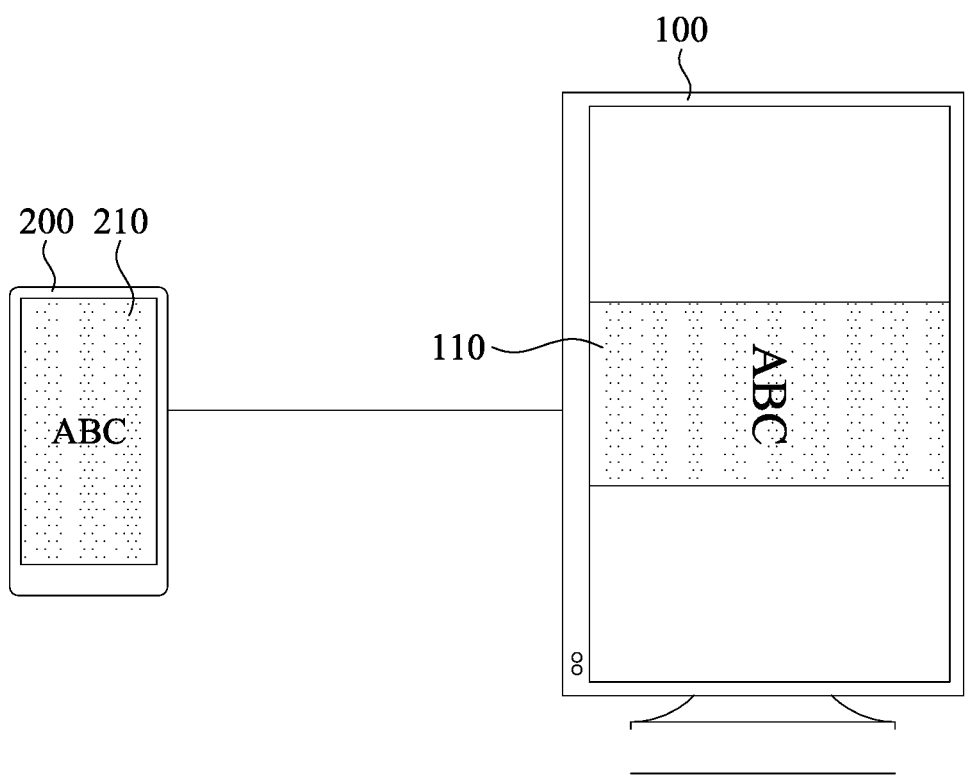
FIG. 1B is a schematic diagram illustrating a screen of a mobile device that is projected onto a display device according to some embodiments of the present disclosure.

Reference is made to FIG. 1A, which is a schematic diagram illustrating a screen 210 of a mobile device 200 that is projected onto a display device 100 according to some embodiments of the present disclosure. FIG. 1A shows a landscape mode of the display device 100 and portrait mode of the mobile device 200. The screen 210 of the mobile device 200 is projected onto the display device 100, that is, a screen 110. When a user changes an arrangement of the display device 100, for example, the display device 100 is changed from the landscape mode in FIG. 1A to the portrait mode in FIG. 1B. However, the screen 110 shown in FIG. 1B is not adjusted by the arrangement of the display device 100. Accordingly, an inconvenience problem is induced when the user watches the screen 110 after the arrangement of the display device 100 is changed.

Figure 2A:
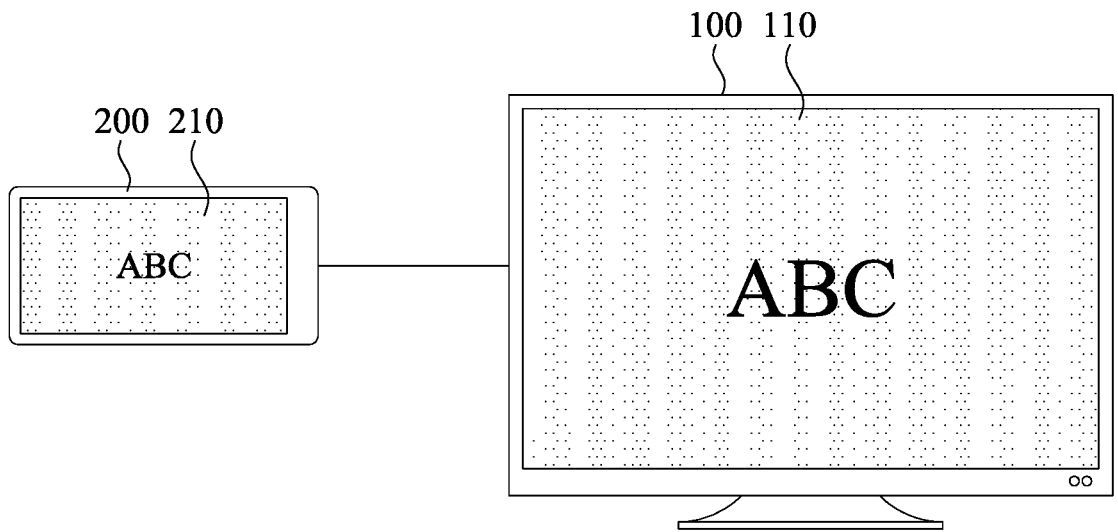
FIG. 2A is a schematic diagram illustrating a screen of a mobile device that is projected onto a display device according to some embodiments of the present disclosure.
Figure 2B:
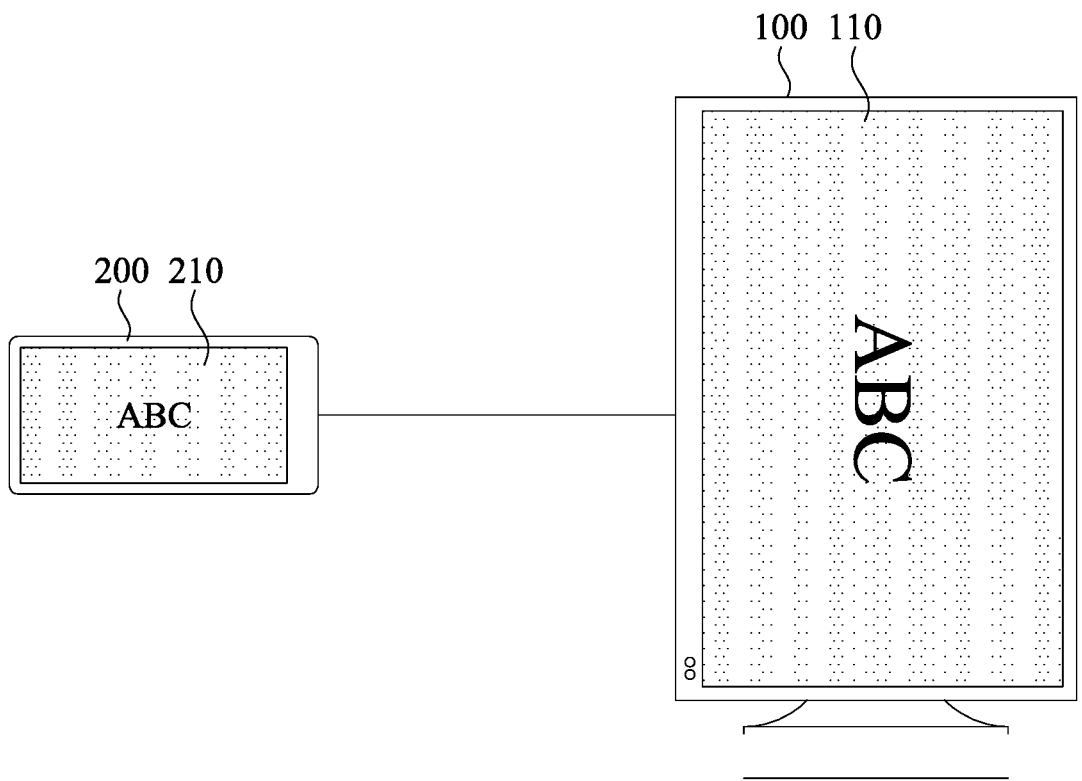
FIG. 2B is a schematic diagram illustrating a screen of a mobile device that is projected onto a display device according to some embodiments of the present disclosure.

Reference is made to FIG. 2A, which is a schematic diagram illustrating the screen 210 of the mobile device 200 that is projected onto the display device 100 according to some embodiments of the present disclosure. In contrast to FIG. 1A, FIG. 2A shows the landscape mode of the display device 100 and the landscape mode of the mobile device 200. Similar to the problem described above, when the user changes the arrangement of the display device 100 as shown in FIG. 2B, the screen 110 is not adjusted by the arrangement of the display device 100. Accordingly, the inconvenience problem is also induced when the user watches the screen 110. For solving the problem, the present disclosure provides a display device and an image display method.

Figure 3:
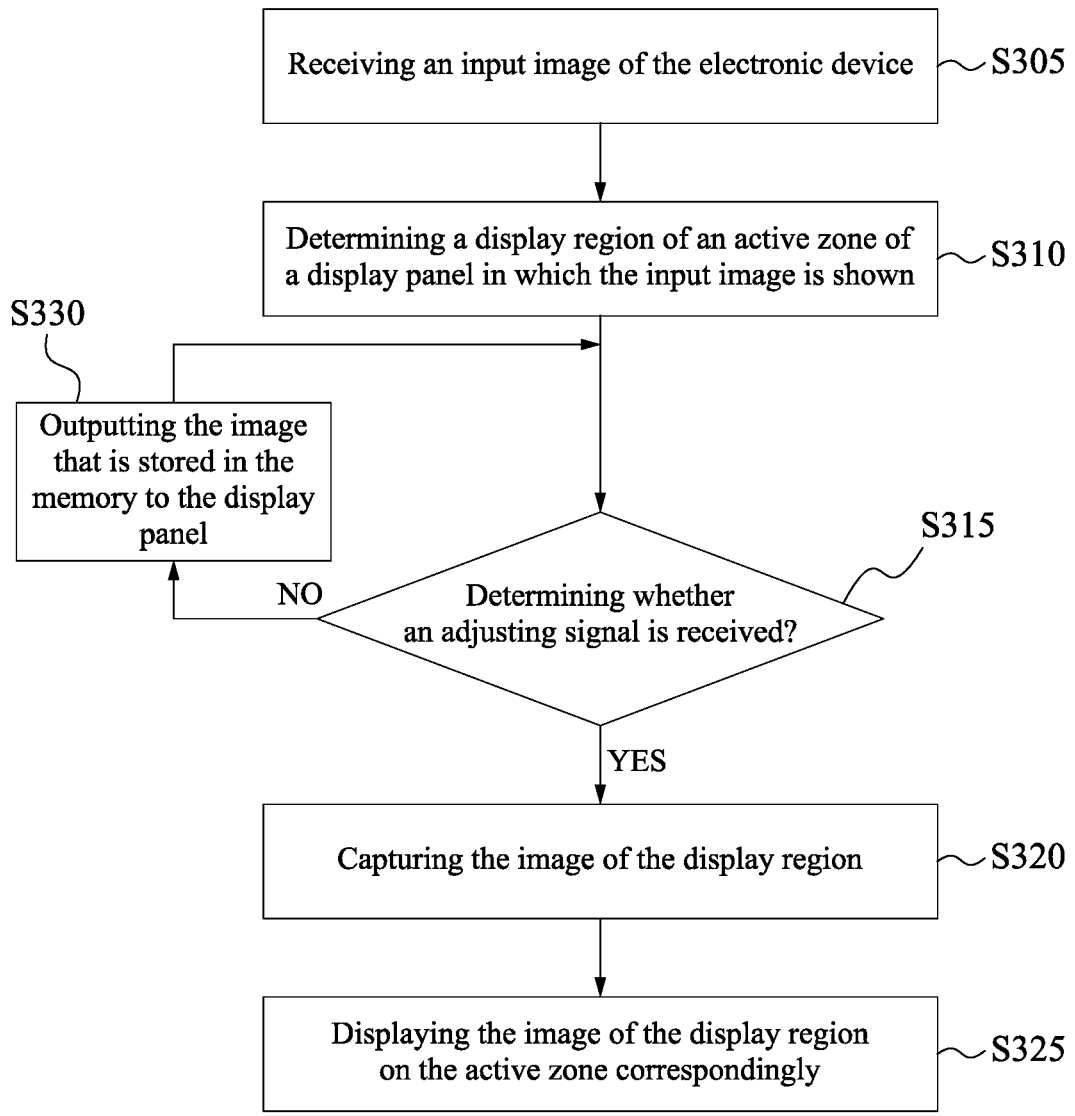
FIG. 3 is a flow chart illustrating an image display method according to some embodiments of the present disclosure.
Figure 4A:
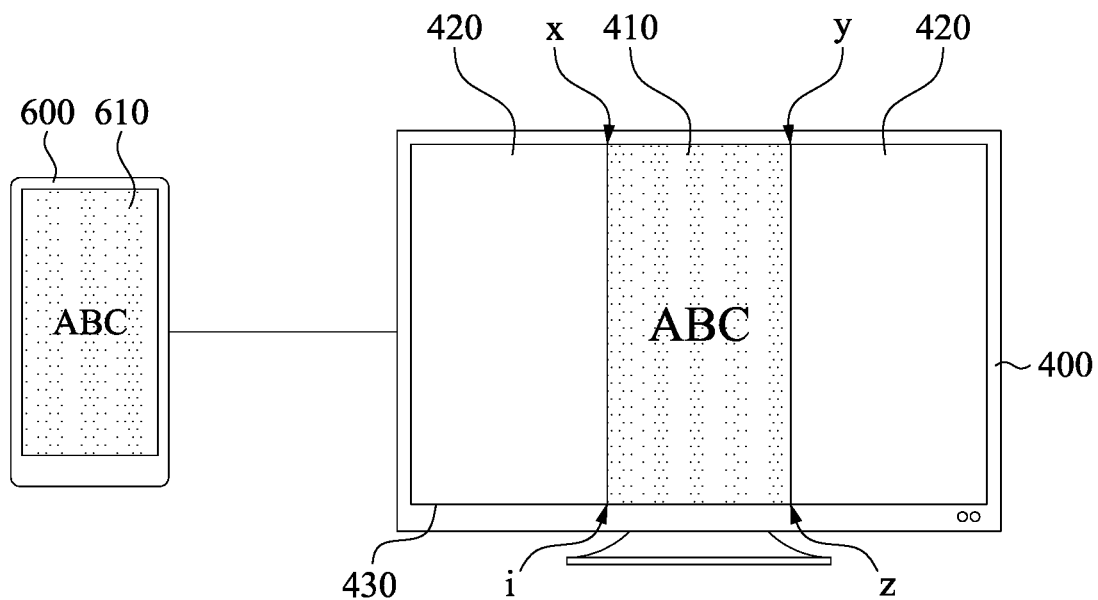
FIG. 4A is a schematic diagram illustrating a screen of a mobile device that is projected onto a display device according to some embodiments of the present disclosure.
Figure 4B:
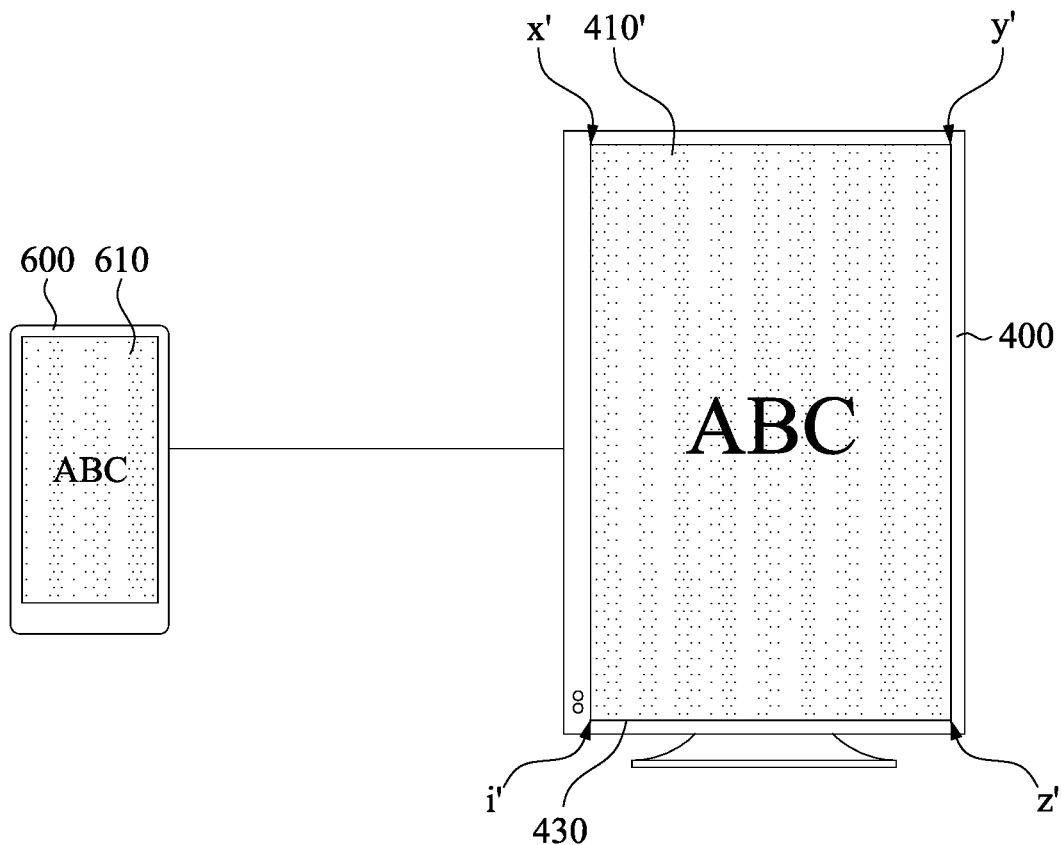
FIG. 4B is a schematic diagram illustrating a screen of a mobile device that is projected onto a display device according to some embodiments of the present disclosure.
Figure 5:
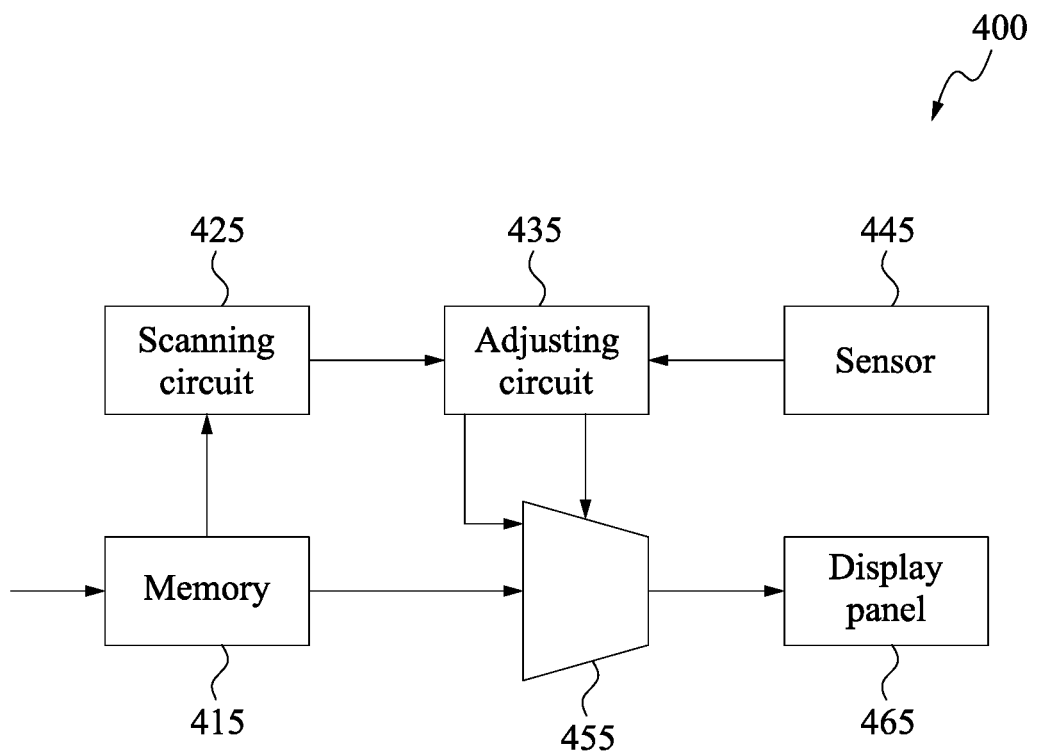
FIG. 5 is a block diagram illustrating a display device according to some embodiments of the present disclosure.

Reference is made to FIG. 3, which is a flow chart illustrating the image display method according to some embodiments of the present disclosure. For facilitating the understanding of the image display method, the following reference is made to FIG. 3, FIG. 4A, FIG. 4B, and FIG. 5. FIG. 4A and FIG. 4B shows that a screen 610 of an electronic device 600 is projected onto a display device 400 when the display device 400 is at the landscape mode and the portrait mode respectively. FIG. 5 is a block diagram illustrating the display device 400.

In step S305, an input image that is provided by the electronic device 600 is received by the display device 400.

Reference is made to FIG. 4A and FIG. 5. In some embodiments, the display device 400 includes communication ports or connection ports (not shown in Figures) which are configured to receive the input image provided by the electronic device 600. In some embodiments, the display device 400 includes a memory 415 which is configured to store the input image provided by the electronic device 600.

In step S310, a display region 410 of an active zone 430 of a display panel 465 in which the input image is shown is determined by a scanning circuit 425 of the display device 400.

Reference is made to FIG. 4A and FIG. 5. In some embodiments, the scanning circuit 425 of the display device 400 scans pixels of each row/column of the display panel 465. If a level of the pixels is larger than a threshold, it represents that the pixels indicate display data and the scanning circuit 425 will record a coordinate of the pixels. In some embodiments, after the scanning circuit 425 scans the active zone 430 in FIG. 4A, the region that contains the displayed screen is set as the display region 410. In other words, the pixels which indicate the display data in the active zone 430 are the display region 410. In another embodiment, the scanning circuit 425 records the pixel coordinate, for example, the pixel coordinates x, y, z, and i in FIG. 4A and the region which is indicated by the four coordinates is set as the display region 410.

In some embodiments, the region in the active zone 430 where no display data is shown is set as a non-display region 420.

In step S315, a determination as to whether an adjusting signal for the display panel 465 is received is made by an adjusting circuit 435 of the display device 400.

Reference is made to FIG. 4A and FIG. 5. In some embodiments, a sensor 445 of the display device 400 is configured to detect whether the arrangement of the display device 400 is changed to generate the adjusting signal. For example, the sensor 445 can be the gravity sensor (G-sensor) or a sensing element which can be disposed on a base of the display device 400. If the arrangement of the display device 400 is changed, the sensing element on the base will be touched and the adjusting signal will be generated accordingly. Subsequently, if the adjusting circuit 435 determines that the adjusting signal is received, step S320 is performed.

In step S320, the adjusting circuit 435 captures the image of the display region 410. Reference is made to FIG. 4A and FIG. 5. In some embodiments, after the adjusting circuit 435 captures an image of the entire of the active zone 430, the image of the non-display region 420 is cut out to obtain the image of the display region 410.

In step S325, the adjusting circuit 435 displays the image of the display region 410 on the active zone 430 correspondingly.

Reference is made to FIG. 4A, FIG. 4B and FIG. 5. In some embodiments, if the display device 400 is arranged at the portrait mode shown in FIG. 4B, a reference point i of the image in the display region 410 in FIG. 4A is mapped to a reference point i' of the active zone 430 in FIG. 4B. Therefore, in the arranged state of FIG. 4B, the display device 400 enlarges, based on the reference point i', the image of the display region 410 in FIG. 4A according to a scaling ratio and further displays the enlarged image on the display device 400 in FIG. 4B. It should be noted that the present disclosure is not limited to the reference point for the screen mapping, and a person of ordinary skill in the art can apply other screen mapping method according to the practical demands.

In some embodiments, the adjusting circuit 435 enlarges the image of the display region 410 in FIG. 4A and displays the enlarged image on the active zone 430 in FIG. 4B. Because an aspect ratio of the image of the display region 410 is not necessarily equal to an aspect ratio of the active zone 430, the enlarged image is probably not equal to the size of the active zone 430. Accordingly, the adjusting circuit 435 can control the aspect ratio of the image of the display region 410 in FIG. 4A to enlarge the image of the display region 410 to display the enlarged image on the active zone 430 in FIG. 4B. The present disclosure is not limited to the means for enlarging the image. In other words, when the arrangement of the display device 400 is changed from the landscape mode to the portrait mode, the adjusting circuit 435 enlarges the image of the display region 410 based on the reference point i' in FIG. 4B and displays the enlarged image on a part of or a whole range of the active zone 430. The enlarged image which is displayed is the image 410' in FIG. 4B.

In some embodiments, if the adjusting signal is not received by the adjusting circuit 435, step S330 is performed.

In step S330, a multiplexer 455 outputs the input image that is stored in the memory 415 to the active zone 430 of the display panel 465.

Therefore, when the arrangement state of the display device 400 is changed, the display device 400 can automatically adjust the screen projected by the electronic device 600 to the screen that is suitable for the user to watch.

Figure 6A:
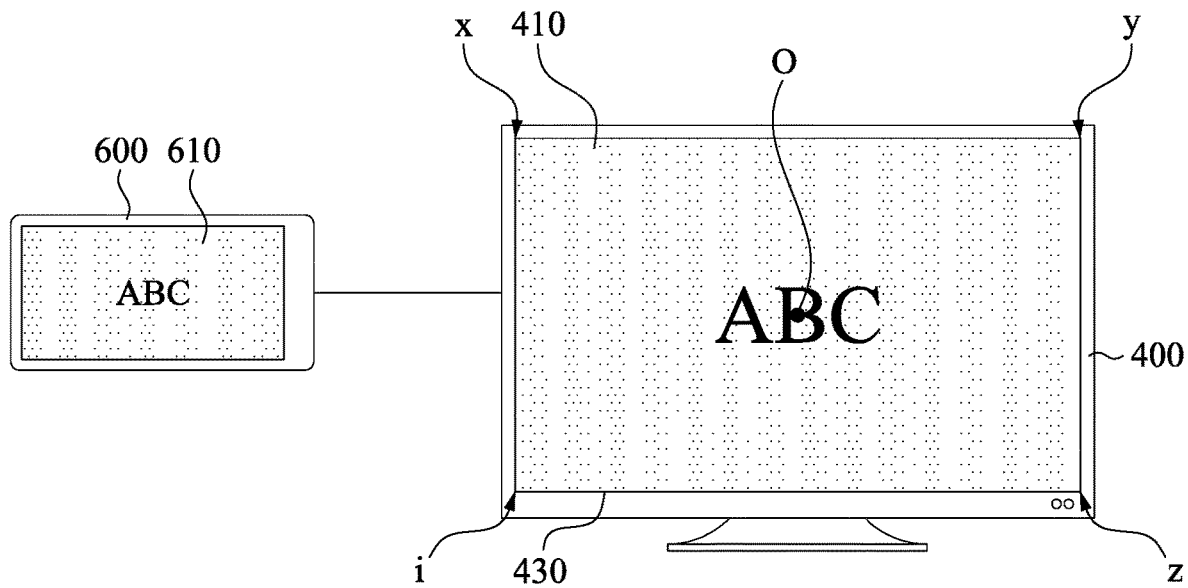
FIG. 6A is a schematic diagram illustrating a screen of a mobile device that is projected onto a display device according to some embodiments of the present disclosure.
Figure 6B:
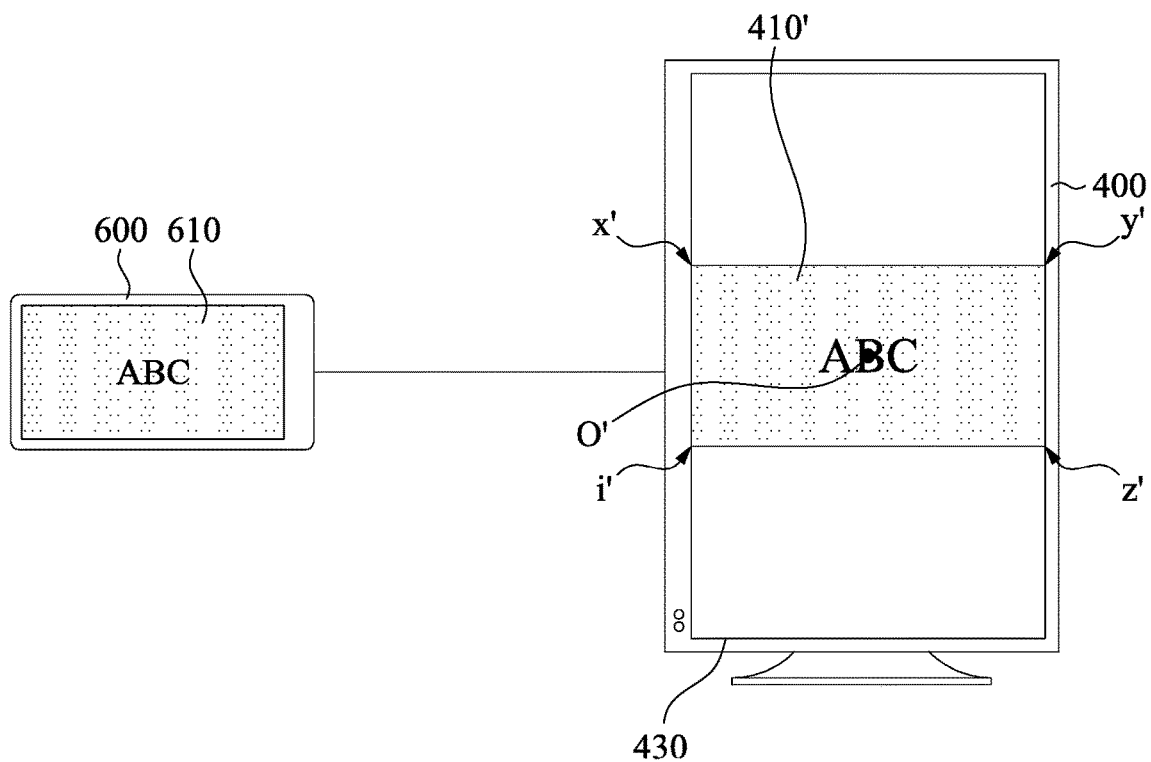
FIG. 6B is a schematic diagram illustrating a screen of a mobile device that is projected onto a display device according to some embodiments of the present disclosure.

For facilitating the understanding of the image display method, other embodiments are described below. Reference is made to FIG. 3, FIG. 5, FIG. 6A and FIG. 6B. FIG. 6A and FIG. 6B show that the screen 610 of the electronic device 600 is projected onto the display device 400 when the display device 400 is at the landscape mode and the portrait mode respectively. It should be noted that the function of elements of the display device 400 in FIG. 6A and FIG. 6B is similar to that of the display device 400 in FIG. 4A and FIG. 4B and the descriptions of the same elements are not repeated herein.

In step S305, the input image that is provided by the electronic device 600 is received by the display device 400.

In step S310, the display region 410 in the active zone 430 of the display panel 465 in which the input image is shown is determined by the scanning circuit 425 of the display device 400.

In step S315, a determination as to whether the adjusting signal for the display panel 465 is received is made by the adjusting circuit 435 of the display device 400.

In some embodiments, if the adjusting circuit 435 determines that the adjusting signal is received, step S320 is performed.

In step S320, the adjusting circuit 435 captures the image of the display region 410. As shown in FIG. 6A, the region of the display region 410 is equal to the region of the active zone 430. In contrast to FIG. 4A, the adjusting circuit 435 in FIG. 6A eliminates the step of cutting out the non-display region 420.

In step S325, the adjusting circuit 435 displays the image of the display region 410 on the active zone 430 correspondingly.

Reference is made to FIG. 5, FIG. 6A and FIG. 6B. In some embodiments, if the display device 400 is arranged at the portrait mode as shown in FIG. 6B, a center point O of the image of the display region 410 is mapped to a center point O' of the active zone 430 in FIG. 6B. In some embodiments, the adjusting circuit 435 reduces scale of the image of the display region 410 in FIG. 6A based on the center point O' in FIG. 6B and displays the image whose scale is reduced on the pixels of part of the active zone 430. Therefore, in the arranged state of FIG. 6B, the display device 400 reduces the scale of the image of the display region 410 in FIG. 6A based on the center point O' with the scaling ratio and displays the scale-reduced image. For example, the scale-reduced image is the image 410' in FIG. 6B.

In some embodiments, if the adjusting signal is not received by the adjusting circuit 330, step S330 is performed.

In step S330, the multiplexer 350 outputs the input image that is stored in the memory 415 to the active zone 430 of the display panel 465.

Therefore, when the arrangement state of the display device 400 is changed, the display device 400 can automatically adjust the screen projected by the electronic device 600 to the screen that is suitable for the user to watch.

Subsequently, the present disclosure provides the function for detecting screen automatically such that the effective display region can be captured. Regardless of the portrait mode or the landscape mode of the display device, the screen can be adjusted and scaled-up/scaled-down automatically as the screen that is suitable for the user to watch. Because the additional buttons or on-screen menu are not required, only the circuit with adjusting function of the display device as shown in FIG. 5 is required for the function described above. In contrast to the traditional projected method that the electronic device works with the display device, the display method that automatically detects and adjusts the screen provides the user the good experience in the present disclosure.

What is claimed is:

1. A display device configured to receive an input image of an electronic device, wherein the display device comprises:
    display panel comprising an active zone;
    scanning circuit configured to determine a display region of the active zone in which the input image is displayed, wherein the scanning circuit is configured to determine whether a level of pixels of the active zone is larger than a threshold, wherein if the scanning circuit determines that the level of pixels of the active zone is larger than the threshold, the pixels of the active zone whose level is larger than the threshold are recorded as the display region; and
    an adjusting circuit coupled to the scanning circuit, wherein the adjusting circuit is configured to capture an image of the display region when an adjusting signal associated with the display panel is received in order to display the image of the display region on the active zone correspondingly, wherein the adjusting circuit is configured to capture an image of the active zone and capture the image of the display region based on the image of the active zone, wherein the adjusting circuit is configured to map a reference point of the image of the display region to a reference point of the active zone in order to display the image of the display region on the active zone.

2. The display device of claim 1, wherein the adjusting circuit is further configured to enlarge the inmge of the display region according to an aspect ratio of the image of the display region.

3. The display device of claim 2, wherein the adjusting circuit is further configured to enlarge the image of the display region based on the reference point of the active zone and to display the image of the display region which is enlarged on a part of or a whole range of the active zone.

4. The display device of claim 1, wherein the adjusting circuit is further configured to reduce scale of the image of the display region according to an aspect ratio of the image of the display region.

5. The display device of claim 4, wherein the adjusting circuit is further configured to reduce the scale of the image of the display region based on the reference point of the active zone, to display the image of the display region whose scale is reduced on the pixels of the part of the active zone.

6. The display device of claim 1, wherein the reference point of the active zone is a center point of the active zone.

7. The display device of claim 1, wherein the adjusting circuit is further configured to select the image of the display region to display the image of the display region on the active zone when the adjusting signal is received and configured to select the input image to display the input image on the active zone when the adjusting signal is not received.

8. An image display method configured for a display device which is coupled to an electronic device, wherein the display device comprises a display panel, and the image display method comprises:
    receiving, by the display device, an input image of the electronic device;
    determining a display region of an active zone of the display panel in which the input image is displayed;
    capturing an image of the display region when an adjusting signal associated with the display panel is received, wherein the step of capturing the image of the display region further comprises:
        capturing an image of the active zone; and
        capturing the image of the display region based on the image of the active zone;
    displaying the image of the display region on the active zone correspondingly;
    determining whether a level of pixels of the active zone is larger than a threshold;
    and recording the pixels of the active zone whose level is larger than the threshold as the display region if determining that the level of pixels of the active zone is larger than the threshold; and mapping a reference point of the image of the display region to a reference point of the active zone in order to display the image of the display region on the active zone.

9. The image display method of claim 8, further comprising: enlarging the image of the display region according to an aspect ratio of the image of the display region.

10. The image display method of claim 9, further comprising:
enlarging the image of the display region based on the reference point of the active zone and to display the image of the display region which is enlarged on a part of or a whole range of the active zone.

11. The image display method of claim 8, further comprising: reducing scale of the image of the display region according to an aspect ratio of the image of the display region.

12. The image display method of claim 11, further comprising:
reducing the scale of the image of the display region based on the reference point of the active zone and displaying the image of the display region whose scale is reduced on the pixels of the part of the active zone.

13. The image display method of claim 8, wherein the reference point of the active zone is a center point of the active zone.

14. The image display method of claim 8, further comprising:
selecting the image of the display region to display the image of the display region on the active zone when the adjusting signal is received; and
selecting the input image to display the input image on the active zone when the adjusting signal is not received.

* * * * *